(12) United States Patent
Albertson

(10) Patent No.: US 8,678,406 B1
(45) Date of Patent: Mar. 25, 2014

(54) ISOLATION SLEEVE

(71) Applicant: GM Global Technology Operations LLC, Detroit, MI (US)

(72) Inventor: Todd D. Albertson, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/631,655

(22) Filed: Sep. 28, 2012

(51) Int. Cl.
 *B62D 7/18* (2006.01)
(52) U.S. Cl.
 USPC .............. 280/93.512; 280/93.51; 384/476; 384/589; 384/492; 384/544
(58) Field of Classification Search
 USPC ........... 280/93.51, 93.511, 93.512; 384/476, 384/492, 544, 589; 301/6.1, 6.5, 105.1, 301/109, 124.1
 See application file for complete search history.

(56) References Cited

U.S. PATENT DOCUMENTS

| | | | | |
|---|---|---|---|---|
| 4,635,952 | A * | 1/1987 | Smith | 280/93.512 |
| 6,626,579 | B1 * | 9/2003 | Silvasi | 384/476 |
| 6,929,331 | B2 * | 8/2005 | Ohtsuki | 301/105.1 |
| 7,524,115 | B2 * | 4/2009 | Komori | 384/476 |
| 2010/0135604 | A1 * | 6/2010 | Ozaki et al. | 384/448 |
| 2010/0296760 | A1 * | 11/2010 | Kapaan et al. | 384/477 |

* cited by examiner

*Primary Examiner* — Toan To
*Assistant Examiner* — Darlene P Condra
(74) *Attorney, Agent, or Firm* — Ingrassia Fisher & Lorenz, P.C.

(57) ABSTRACT

Vehicles and systems are provided. In accordance with one embodiment, for example, a vehicle may include, but is not limited to, an axle, a bearing coupled to the axle, a knuckle coupled to the bearing, and an isolation sleeve coupled between the bearing and the knuckle. In one embodiment, for example, the isolation sleeve may be composed of solid zinc. In another embodiment, for example, the isolation sleeve may include a zinc coating.

13 Claims, 3 Drawing Sheets

US 8,678,406 B1

ISOLATION SLEEVE

TECHNICAL FIELD

The technical field generally relates to vehicles, and more particularly relates to isolation sleeves between automotive components composed of different materials.

BACKGROUND

Vehicles are exposed to a variety of environmental factors which can cause damage to the vehicle. Salt, for example, which is placed on roads to melt snow and ice can increase the rate at which rust forms on a vehicle. Furthermore, when automotive components of two different materials are coupled together and exposed to salt or other corrosive elements, the salt can cause components of two different materials to react with each other, further increasing the rate of corrosion at the interface between the two components.

SUMMARY

In one embodiment, for example, a vehicle is provided. The vehicle may include, but is not limited to, an axle, a bearing coupled to the axle, a knuckle coupled to the bearing, and an isolation sleeve coupled between the bearing and the knuckle.

In one embodiment, for example, a system is provided. The system may include, but is not limited to, an axle, a bearing coupled to the axle, a knuckle coupled to the bearing, and an isolation sleeve coupled between the bearing and the knuckle.

In yet another embodiment, for example, a vehicle is provided. The vehicle may include, but is not limited to, a first automotive component comprising steel, a second automotive component comprising aluminum, and an isolation sleeve coupled between the first automotive component and the second automotive component.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Modern vehicles are made of a variety of different materials. Some components may be made, for example, of steel for its superior strength. Other components may be made, for example, of aluminum to save weight. However, when steel components and aluminum components are in contact and are exposed to salt or other corrosive elements, the salt can significantly increase the rate of the formation of corrosion, such as rust, at the junction. The rust can make the components difficult to separate when the vehicle needs to be serviced, sometimes requiring both of the components to be replaced even when only one of the components needs to be serviced. Accordingly, as discussed in further detail below, an isolation sleeve may be provided between the steel and aluminum components to minimize the occurrence of rust.

Figure 1:
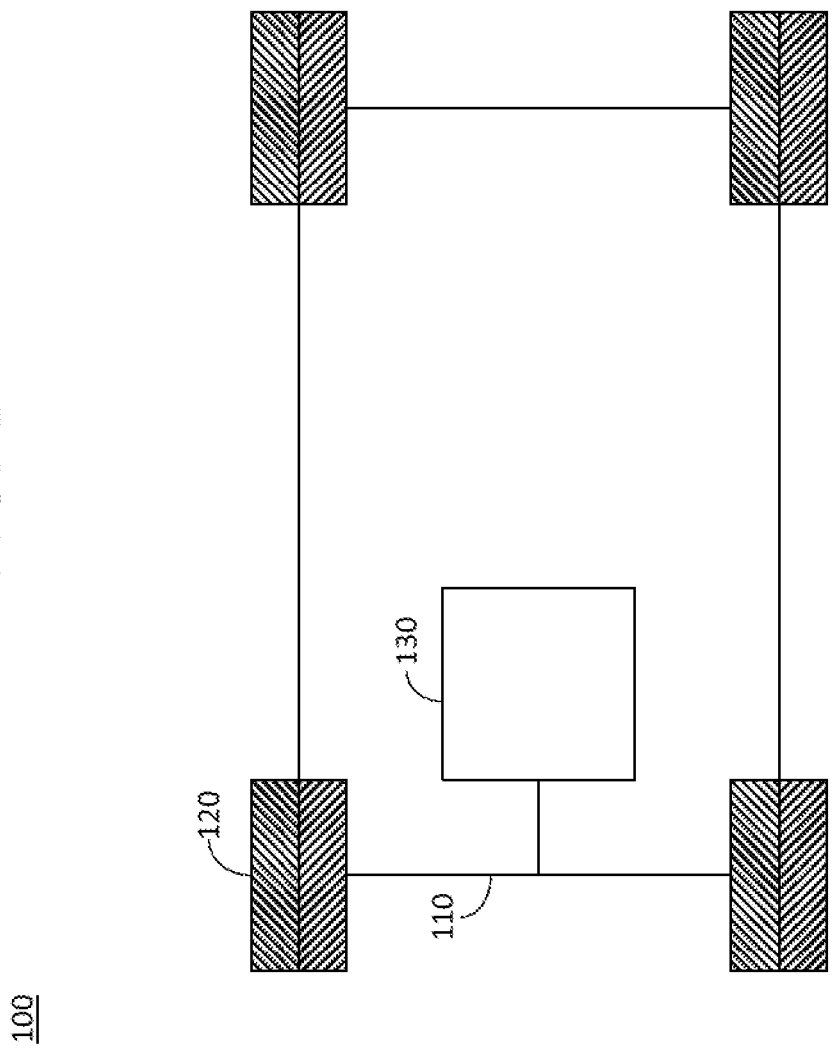
FIG. 1 is high level view of a vehicle 100 in accordance with an embodiment.

FIG. 1 is high level view of a vehicle 100 in accordance with an embodiment. The vehicle 100 may be any type of motorized or non-motorized vehicle, including, but not limited to, automobiles, motorcycles, aircraft, marine vehicles or the like. The vehicle includes at least one axle 110 which allows at least one wheel 120 to rotate. In one embodiment, for example, the axle 110 may be a drive shaft rotated by a motor 130. When the vehicle is a front wheel drive car, the axle 110 may be a half shaft. Each of the front wheels on the front wheel drive car may have its own half shaft.

Figure 2:
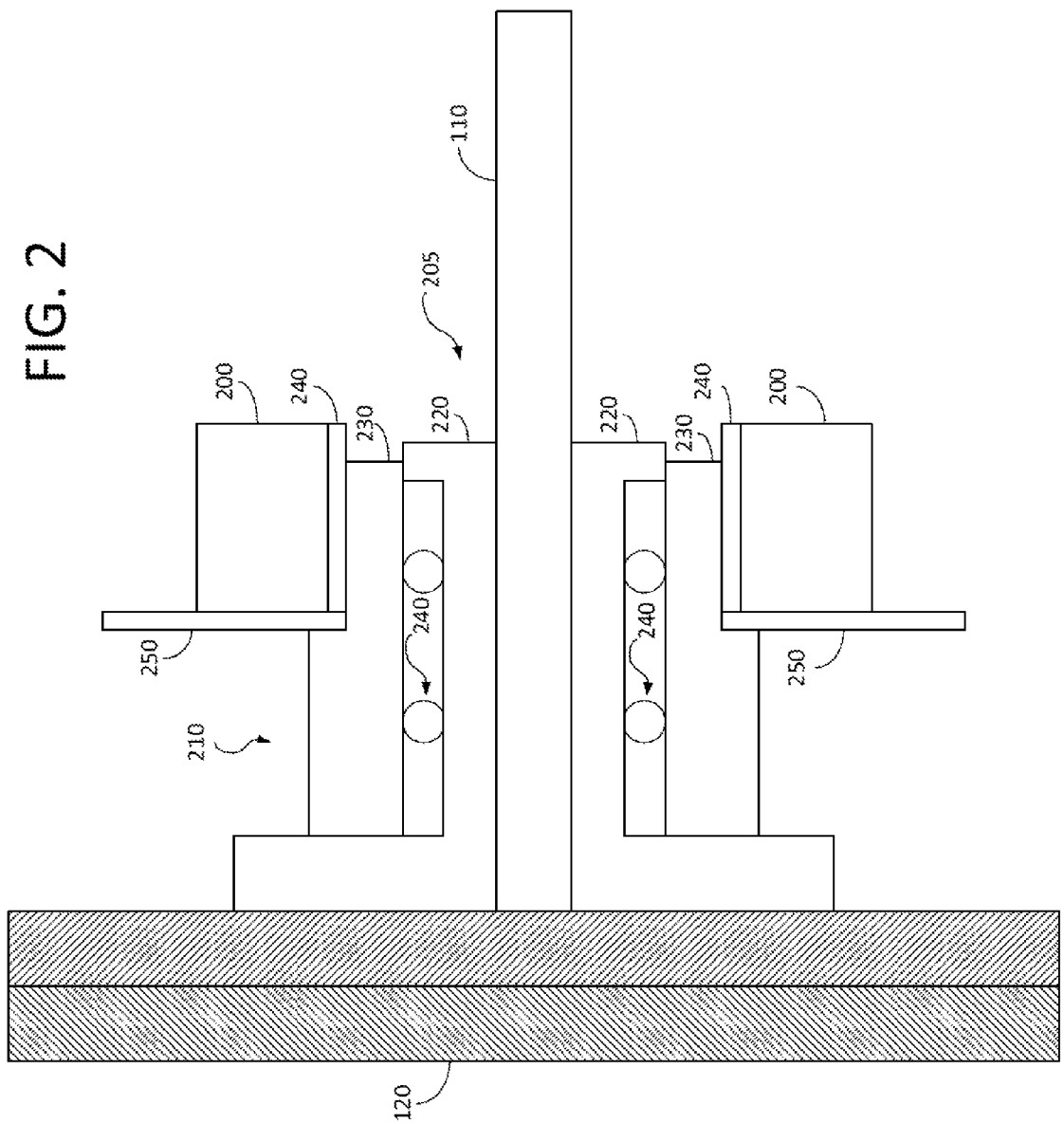
FIG. 2 illustrates a cross section of an area around an exemplary wheel 120 in the vehicle 100, in accordance with an embodiment.

FIG. 2 illustrates a cross section of an area around an exemplary wheel 120 in the vehicle 100, in accordance with an embodiment. The vehicle 100 includes a knuckle 200 for each wheel 120 on the vehicle 100. In one embodiment, for example, the knuckle 200 couples at least one wheel 120 to a steering mechanism, such as a steering wheel (not shown). The knuckle 200 is designed to keep the wheel vertical while allowing the wheel to turn. Both of the front wheels 120 and rear wheels of a vehicle may have a knuckle 200. The knuckle 200 is generally made out of aluminum to minimize its weight while maintaining enough structural integrity to withstand acceleration, breaking and turning forces generated during operation of a vehicle. The knuckle 200 is generally shaped to be attached to suspension components and includes a cylindrical bore 205 through which the axle 110 extends.

The axle 110 is coupled to a bearing 210. The components of the bearing 210 are generally made of steel. The bearing 210 includes a spindle 220, an outer ring 230 and a series of bearings elements 240 arranged between the spindle 220 and the outer ring 230. The spindle 220 is coupled to the axle 110 and rotates with the axle 110. In one embodiment, for example, the spindle 220 may be fastened to the axle 110 via one or more bolts or screws. In other embodiments, for example, a nut and thread may be used to attach the components. The outer ring 230 is coupled to the knuckle 200. In one embodiment, for example, the outer ring 230 may be fastened to the knuckle 200 via one or more bolts, screws, and or nuts. The bearings elements 240 are arranged in channels or races formed between the spindle 220 and outer ring 230 which allow the spindle 220 and axle 110 to efficiently rotate. In the embodiment illustrated in FIG. 2, the bearing elements 240 are ball bearings, but other types of bearing elements, such as roller bearings, may be used.

During normal driving conditions, the bearing 210 and knuckle 200 may be exposed to salt or another corrosive element. Because the knuckle 200 is made from aluminum and the bearing 210 is made from steel, the salt can cause the metals at the junction between the knuckle 200 and the bearing 210 to react, accelerating the formation of corrosion which can essentially weld or fuse the knuckle 200 to the bearing 210.

Accordingly, the vehicle 100 further includes an isolation sleeve 240 positioned between the outer ring 230 of the bearing 210 and the knuckle 200. In one embodiment, for example, the isolation sleeve 240 may be formed from solid zinc. In other embodiments, for example, the isolation sleeve may have a zinc coating on top of another base material, such as steel. In other embodiments, the base material could be solid zinc, or any other suitable metal or sufficiently rigid material. When steel and aluminum are coupled together and exposed to a corrosive, the rate at which rust forms at the junction is dramatically increased. The zinc isolation sleeve 240 acts as a neutralizer or neutral barrier between the knuckle 200 and the bearing 210, which reduces the amount of rust that can form in the junction.

Figure 3:
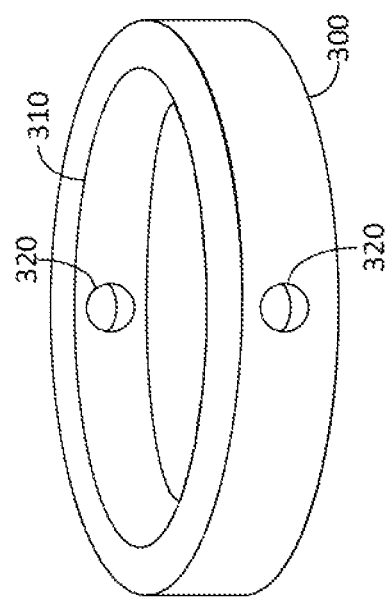
FIG. 3 is a perspective view on an exemplary isolation sleeve 240, in accordance with an embodiment.

FIG. 3 is a perspective view on an exemplary isolation sleeve 240, in accordance with an embodiment. In this embodiment, for example, the isolation sleeve 240 is substantially ring shaped. An outer surface 300 of the isolation sleeve 240 has a first diameter and is configured to be coupled to the outer ring 230 (of FIG. 2). An inner surface 310 of the isolation sleeve 240 has a second diameter, less than the first diameter, and is configured to be coupled to the knuckle 200 (of FIG. 2). The shape of the isolation sleeve 240, however, can vary depending upon the shape of the bearing 210 and the knuckle 200.

In one embodiment, for example, the isolation sleeve may include one or more inclusions 320 through which a bolt or other attachment mechanism can be used to attach the isolation sleeve 240 to the knuckle 200 and the bearing 210. In other embodiments, for example, the isolation sleeve 240, knuckle 200, and the bearing 210 may be press fit. In one embodiment, for example, an inner surface of at least one of the inclusions 320 may be threaded (not illustrated). In another embodiment, for example, the inclusions 320 may have a substantially smooth inner surface.

One benefit of the isolation sleeve 240, for example, is that the isolation sleeve reduces the amount of corrosion between automotive components, such as a knuckle and a bearing. In some instances, when the isolation sleeve is not present, a functional knuckle may have to be replaced in order to service a worn bearing because of rust which essentially has fused the two components together. However, when the isolation sleeve is present, the amount of rust that can form between components is reduced, allowing the bearing to be serviced or replaced without having to replace the knuckle.

Returning to FIG. 2, in one embodiment, for example, the vehicle may further include at least one splash shield 250. In one embodiment, for example, the splash shield 250 may be arranged between the knuckle 200 and the outer ring 230 of the bearing 210. The splash shield 250 is arranged to reduce the amount of salt and other environmental elements which can enter the wheel region. Accordingly, one benefit of the splash shield 250 is to reduce the amount of salt that the junction of the knuckle 200 and bearing 210 is exposed too.

While the embodiments discussed above illustrate an isolation sleeve positioned between a bearing and a knuckle, one of ordinary skill in the art would recognize that the isolation sleeve could be placed between any two components made of any two materials that could react when exposed to environmental factors such as salt.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   an axle;
   a bearing coupled to the axle;
   a knuckle coupled to the bearing;
   an isolation sleeve coupled between the bearing and the knuckle, the isolation sleeve having an inner surface configured to contact the bearing and an outer surface configured to contact the knuckle, wherein the isolation sleeve comprises at least two substantially cylindrical inclusions between the inner surface and the outer surface; and
   a fastener connecting the bearing to the knuckle through each of the at least two substantially cylindrical inclusions.

2. The vehicle of claim 1, wherein the isolation sleeve is composed of solid zinc.

3. The vehicle of claim 1, wherein the isolation sleeve includes a zinc coating.

4. The vehicle of claim 1, wherein the isolation sleeve is substantially ring shaped.

5. The vehicle of claim 1, further comprising a splash shield coupled between the bearing and the knuckle.

6. A system, comprising:
   an axle;
   a bearing coupled to the axle;
   a knuckle coupled to the bearing;
   an isolation sleeve coupled between the bearing and the knuckle, the isolation sleeve having an inner surface configured to contact the bearing and an outer surface configured to contact the knuckle, wherein the isolation sleeve comprises at least two inclusions between the inner surface and the outer surface; and
   a fastener connecting the bearing to the knuckle through each of the at least two inclusions.

7. The system of claim 6, wherein the isolation sleeve is composed of solid zinc.

8. The system of claim 6, wherein the isolation sleeve includes a zinc coating.

9. The system of claim 6, wherein the isolation sleeve is substantially ring shaped.

10. The system of claim 6, further comprising a splash shield coupled between the bearing and the knuckle.

11. A vehicle, comprising:
    a first automotive component comprising steel;
    a second automotive component comprising aluminum;
    an isolation sleeve coupled between the first automotive component and the second automotive component, the isolation sleeve having an inner surface configured to contact the first automotive component and an outer surface configured to contact the second automotive component, wherein the isolation sleeve comprises at least two substantially cylindrical inclusions between the inner surface and the outer surface; and
    a fastener connecting the first automotive component to the second automotive component through each of the at least two substantially cylindrical inclusions.

12. The vehicle of claim 11, wherein the isolation sleeve is composed of solid zinc.

13. The vehicle of claim 11, wherein the isolation sleeve is comprises a zinc coating.

* * * * *